US011496282B1

(12) United States Patent
Hormati et al.

(10) Patent No.: US 11,496,282 B1
(45) Date of Patent: Nov. 8, 2022

(54) HORIZONTAL CENTERING OF SAMPLING POINT USING VERTICAL VERNIER

(71) Applicant: Kandou Labs SA, Lausanne (CH)

(72) Inventors: Ali Hormati, Ecublens Vaud (CH); Charles Dedic, London (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 17/339,722

(22) Filed: Jun. 4, 2021

(51) Int. Cl.
H04L 7/00 (2006.01)
H04L 27/02 (2006.01)

(52) U.S. Cl.
CPC ............ H04L 7/0054 (2013.01); H04L 27/02 (2013.01)

(58) Field of Classification Search
CPC .............................. H04L 7/0054; H04L 27/02
USPC ................................................ 375/340, 355
See application file for complete search history.

(56) References Cited

U.S. PATENT DOCUMENTS

| 4,839,907 A | 6/1989 | Saneski |
| 5,266,907 A | 11/1993 | Dacus |
| 5,302,920 A | 4/1994 | Bitting |
| 5,528,198 A | 6/1996 | Baba et al. |
| 5,565,817 A | 10/1996 | Lakshmikumar |
| 5,602,884 A | 2/1997 | Wieczorkiewicz et al. |
| 5,629,651 A | 5/1997 | Mizuno |
| 5,802,356 A | 9/1998 | Gaskins et al. |
| 6,002,717 A | 12/1999 | Gaudet |
| 6,026,134 A | 2/2000 | Duffy et al. |
| 6,037,812 A | 3/2000 | Gaudet |
| 6,122,336 A | 9/2000 | Anderson |
| 6,307,906 B1 | 10/2001 | Tanji et al. |
| 6,316,987 B1 | 11/2001 | Dally et al. |
| 6,380,783 B1 | 4/2002 | Chao et al. |
| 6,389,091 B1 | 5/2002 | Yamaguchi et al. |
| 6,426,660 B1 | 7/2002 | Ho et al. |
| 6,507,544 B1 | 1/2003 | Ma et al. |

(Continued)

FOREIGN PATENT DOCUMENTS

| CN | 203675093 U | 6/2014 |
| EP | 0740423 A2 | 10/1996 |

(Continued)

OTHER PUBLICATIONS

Chang, Hong-Yeh , et al., "A Low-Jitter Low-Phase-Noise 10-GHz Sub-Harmonically Injection-Locked PLL With Self-Aligned DLL in 65-nm CMOS Technology", IEEE Transactions on Microwave Theory and Techniques, vol. 62, No. 3, Mar. 2014, 543-555 (13 pages).

(Continued)

Primary Examiner — Don N Vo
(74) Attorney, Agent, or Firm — Invention Mine LLC

(57) ABSTRACT

Methods and systems are described for measuring a vertical opening of a signal eye of a pulse amplitude modulated (PAM) signal received over a channel to determine a vertically-centered voltage decision threshold of a sampler receiving a sampling clock, determining channel-characteristic parameters indicative of a frequency response of the channel, determining a correctional vernier value from the channel-characteristic parameters, and generating a horizontally-centered voltage decision threshold that introduces a horizontal sampling offset in the sampling clock in a direction closer to a horizontal center of the signal eye by combining the vertically-centered voltage decision threshold and the correctional vernier value.

20 Claims, 8 Drawing Sheets

(56) References Cited

U.S. PATENT DOCUMENTS

| | | |
|---|---|---|
| 6,509,773 B2 | 1/2003 | Buchwald et al. |
| 6,633,621 B1 | 10/2003 | Bishop et al. |
| 6,650,699 B1 | 11/2003 | Tierno |
| 6,717,478 B1 | 4/2004 | Kim et al. |
| 6,838,951 B1 | 1/2005 | Nieri et al. |
| 6,917,762 B2 | 7/2005 | Kim |
| 7,078,978 B2 | 7/2006 | Wakii |
| 7,102,449 B1 | 9/2006 | Mohan |
| 7,158,441 B2 | 1/2007 | Okamura |
| 7,199,728 B2 | 4/2007 | Dally et al. |
| 7,336,112 B1 | 2/2008 | Sha et al. |
| 7,336,749 B2 * | 2/2008 | Garlepp ............ H04L 1/20 375/355 |
| 7,532,697 B1 | 5/2009 | Sidiropoulos et al. |
| 7,535,957 B2 | 5/2009 | Ozawa et al. |
| 7,616,075 B2 | 11/2009 | Kushiyama |
| 7,650,525 B1 | 1/2010 | Chang et al. |
| 7,688,887 B2 | 3/2010 | Gupta et al. |
| 7,688,929 B2 | 3/2010 | Co |
| 7,697,647 B1 | 4/2010 | McShea |
| 7,822,113 B2 | 10/2010 | Tonietto et al. |
| 7,839,229 B2 | 11/2010 | Nakamura et al. |
| 7,852,109 B1 | 12/2010 | Chan et al. |
| 7,860,190 B2 | 12/2010 | Feller |
| 7,876,866 B1 | 1/2011 | McAdam et al. |
| 8,036,300 B2 | 10/2011 | Evans et al. |
| 8,045,608 B2 | 10/2011 | Dai et al. |
| 8,074,126 B1 | 12/2011 | Qian et al. |
| 8,116,409 B1 * | 2/2012 | Warner ............ H04L 7/0337 375/355 |
| 8,253,454 B2 | 8/2012 | Lin |
| 8,407,511 B2 | 3/2013 | Mobin et al. |
| 8,583,072 B1 | 11/2013 | Ciubotaru et al. |
| 8,649,476 B2 | 2/2014 | Malipatil et al. |
| 8,744,012 B1 | 6/2014 | Ding et al. |
| 8,791,735 B1 | 7/2014 | Shibasaki |
| 8,929,496 B2 | 1/2015 | Lee et al. |
| 9,036,764 B1 | 5/2015 | Hossain et al. |
| 9,059,816 B1 | 6/2015 | Simpson et al. |
| 9,100,232 B1 | 8/2015 | Hormati et al. |
| 9,306,621 B2 | 4/2016 | Zhang et al. |
| 9,374,250 B1 | 6/2016 | Musah et al. |
| 9,397,868 B1 | 7/2016 | Hossain et al. |
| 9,438,409 B1 | 9/2016 | Liao et al. |
| 9,444,588 B1 | 9/2016 | Katic et al. |
| 9,520,883 B2 | 12/2016 | Shibasaki |
| 9,565,036 B2 | 2/2017 | Zerbe et al. |
| 9,577,815 B1 | 2/2017 | Simpson et al. |
| 9,602,111 B1 | 3/2017 | Shen et al. |
| 9,906,358 B1 | 2/2018 | Tajalli |
| 9,917,607 B1 | 3/2018 | Zhang et al. |
| 9,960,902 B1 | 5/2018 | Lin et al. |
| 10,055,372 B2 | 8/2018 | Shokrollahi |
| 10,193,716 B2 | 1/2019 | Hormati et al. |
| 10,326,435 B2 | 6/2019 | Arp et al. |
| 10,491,365 B1 | 11/2019 | Lin |
| 10,574,487 B1 | 2/2020 | Hormati |
| 10,791,009 B1 | 9/2020 | Wu et al. |
| 10,848,351 B2 | 11/2020 | Hormati |
| 10,904,046 B2 | 1/2021 | Hormati |
| 2003/0001557 A1 | 1/2003 | Pisipaty |
| 2003/0146783 A1 | 8/2003 | Bandy et al. |
| 2003/0212930 A1 | 11/2003 | Aung et al. |
| 2003/0214977 A1 | 11/2003 | Kuo |
| 2004/0092240 A1 | 5/2004 | Hayashi |
| 2004/0141567 A1 | 7/2004 | Yang et al. |
| 2005/0024117 A1 | 2/2005 | Kubo et al. |
| 2005/0084050 A1 | 4/2005 | Cheung et al. |
| 2005/0117404 A1 | 6/2005 | Savoj |
| 2005/0128018 A1 | 6/2005 | Meltzer |
| 2005/0141662 A1 | 6/2005 | Sano et al. |
| 2005/0201491 A1 | 9/2005 | Wei |
| 2005/0220182 A1 | 10/2005 | Kuwata |
| 2005/0275470 A1 | 12/2005 | Choi |
| 2006/0062058 A1 | 3/2006 | Lin |
| 2006/0140324 A1 | 6/2006 | Casper et al. |
| 2006/0232461 A1 | 10/2006 | Felder |
| 2007/0001713 A1 | 1/2007 | Lin |
| 2007/0001723 A1 | 1/2007 | Lin |
| 2007/0047689 A1 | 3/2007 | Menolfi et al. |
| 2007/0058768 A1 | 3/2007 | Werner |
| 2007/0086267 A1 | 4/2007 | Kwak |
| 2007/0127612 A1 | 6/2007 | Lee et al. |
| 2007/0146088 A1 | 6/2007 | Arai et al. |
| 2007/0147559 A1 | 6/2007 | Lapointe |
| 2007/0183552 A1 | 8/2007 | Sanders et al. |
| 2007/0201597 A1 | 8/2007 | He et al. |
| 2007/0253475 A1 | 11/2007 | Palmer |
| 2008/0007367 A1 | 1/2008 | Kim |
| 2008/0069276 A1 | 3/2008 | Wong et al. |
| 2008/0111634 A1 | 5/2008 | Min |
| 2008/0136479 A1 | 6/2008 | You et al. |
| 2008/0165841 A1 | 7/2008 | Wall et al. |
| 2008/0181289 A1 | 7/2008 | Moll |
| 2008/0219399 A1 | 9/2008 | Nary |
| 2008/0317188 A1 | 12/2008 | Staszewski et al. |
| 2009/0103675 A1 | 4/2009 | Yousefi et al. |
| 2009/0167389 A1 | 7/2009 | Reis |
| 2009/0195281 A1 | 8/2009 | Tamura et al. |
| 2009/0231006 A1 | 9/2009 | Jang et al. |
| 2009/0243679 A1 | 10/2009 | Smith et al. |
| 2009/0262876 A1 | 10/2009 | Arima et al. |
| 2009/0262877 A1 | 10/2009 | Shi et al. |
| 2010/0033259 A1 | 2/2010 | Miyashita |
| 2010/0090723 A1 | 4/2010 | Nedovic et al. |
| 2010/0090735 A1 | 4/2010 | Cho |
| 2010/0156543 A1 | 6/2010 | Dubey |
| 2010/0177816 A1 * | 7/2010 | Malipatil ........ H04L 25/03343 375/232 |
| 2010/0180143 A1 | 7/2010 | Ware et al. |
| 2010/0220828 A1 | 9/2010 | Fuller et al. |
| 2010/0329322 A1 | 12/2010 | Mobin et al. |
| 2010/0329325 A1 | 12/2010 | Mobin et al. |
| 2011/0002181 A1 | 1/2011 | Wang et al. |
| 2011/0025392 A1 | 2/2011 | Wu et al. |
| 2011/0148498 A1 | 6/2011 | Mosalikanti et al. |
| 2011/0234278 A1 | 9/2011 | Seo |
| 2011/0311008 A1 | 12/2011 | Slezak et al. |
| 2012/0051480 A1 | 3/2012 | Usugi et al. |
| 2012/0170621 A1 | 7/2012 | Tracy et al. |
| 2012/0200364 A1 | 8/2012 | Iizuka et al. |
| 2012/0206177 A1 | 8/2012 | Colinet et al. |
| 2012/0235717 A1 | 9/2012 | Hirai et al. |
| 2012/0327993 A1 | 12/2012 | Palmer |
| 2013/0088274 A1 | 4/2013 | Gu |
| 2013/0091392 A1 | 4/2013 | Valliappan et al. |
| 2013/0093471 A1 | 4/2013 | Cho et al. |
| 2013/0107997 A1 | 5/2013 | Chen |
| 2013/0108001 A1 | 5/2013 | Chang et al. |
| 2013/0207706 A1 | 8/2013 | Yanagisawa |
| 2013/0243127 A1 | 9/2013 | Ito et al. |
| 2013/0271194 A1 | 10/2013 | Madoglio et al. |
| 2013/0285720 A1 | 10/2013 | Jibry |
| 2013/0314142 A1 | 11/2013 | Tamura et al. |
| 2014/0086291 A1 * | 3/2014 | Asmanis ............ H04L 25/14 375/224 |
| 2014/0286381 A1 | 9/2014 | Shibasaki |
| 2014/0286457 A1 | 9/2014 | Chaivipas |
| 2015/0043627 A1 | 2/2015 | Kang et al. |
| 2015/0078495 A1 | 3/2015 | Hossain et al. |
| 2015/0117579 A1 | 4/2015 | Shibasaki |
| 2015/0180642 A1 | 6/2015 | Hsieh et al. |
| 2015/0220472 A1 | 8/2015 | Sengoku |
| 2015/0256326 A1 | 9/2015 | Simpson et al. |
| 2016/0056980 A1 | 2/2016 | Wang et al. |
| 2016/0087610 A1 | 3/2016 | Hata |
| 2016/0134267 A1 | 5/2016 | Adachi |
| 2017/0134190 A1 | 5/2017 | Hoshyar et al. |
| 2017/0228215 A1 | 8/2017 | Chatwin et al. |
| 2017/0310456 A1 | 10/2017 | Tajalli |
| 2018/0083638 A1 | 3/2018 | Tajalli |
| 2018/0083763 A1 | 3/2018 | Black et al. |
| 2018/0219539 A1 | 8/2018 | Arp et al. |
| 2018/0227114 A1 | 8/2018 | Rahman et al. |

(56) References Cited

U.S. PATENT DOCUMENTS

| | | | |
|---|---|---|---|
| 2018/0248723 | A1 | 8/2018 | Palmer |
| 2018/0343011 | A1 | 11/2018 | Tajalli et al. |
| 2018/0375693 | A1 | 12/2018 | Zhou et al. |
| 2019/0109735 | A1 | 4/2019 | Norimatsu |
| 2019/0238180 | A1* | 8/2019 | Ulrich .................. G06F 1/00 |
| 2019/0241424 | A1 | 8/2019 | Maloigne |
| 2019/0377378 | A1 | 12/2019 | Gharibdoust |
| 2020/0162233 | A1 | 5/2020 | Lee et al. |
| 2021/0248103 | A1 | 8/2021 | Khashaba et al. |
| 2021/0281449 | A1 | 9/2021 | Wang et al. |
| 2022/0085967 | A1 | 3/2022 | Vrazel |

FOREIGN PATENT DOCUMENTS

| | | |
|---|---|---|
| EP | 2451129 A2 | 5/2012 |
| JP | 3615692 B2 | 11/2004 |

OTHER PUBLICATIONS

Ha, J.C., et al., "Unified All-Digital Duty-Cycle and phase correction circuit for QDR I/O interface", Electronic Letters, The Institution of Engineering and Technology, vol. 44, No. 22, Oct. 23, 2008, 1300-1301 (2 pages).

Loh, Mattew, et al., "A 3×9 GB/s Shared, All-Digital CDR for High-Speed, High-Density I/O", IEEE Journal of Solid-State Circuits, vol. 47, No. 3, Mar. 2012, 641-651 (11 pages).

Nandwana, Romesh Kumar, et al., "A Calibration-Free Fractional-N Ring PLL Using Hybrid Phase/Current-Mode Phase Interpolation Method", IEEE Journal of Solid-State Circuits, vol. 50, No. 4, Apr. 2015, 882-895 (14 pages).

Ng, Herman Jalli, et al., "Low Phase Noise 77-GHz Fractional-N PLL with DLL-based Reference Frequency Multiplier for FMCW Radars", European Microwave Integrated Circuits Conference, Oct. 10-11, 2011, 196-199 (4 pages).

Riley, M. W., et al., "Cell Broadband Engine Processor: Design and Implementation", IBM Journal of Research and Development, vol. 51, No. 5, Sep. 2007, 545-557 (13 pages).

Ryu, Kyungho, et al., "Process-Variation-Calibrated Multiphase Delay Locked Loop With a Loop-Enbedded Duty Cycle Corrector", IEEE Transactions on Circuits and Systems, vol. 61, No. 1, Jan. 2014, 1-5 (5 pages).

Tajalli, Armin, "Wideband PLL Using Matrix Phase Comparator", Journal of Latex Class Files, vol. 14, No. 8, Aug. 2016, 1-8 (8 pages).

Tan, Han-Yuan, "Design of Noise-Robust Clock and Data Recovery Using an Adaptive-Bandwidth Mixed PLL/DLL", Harvard University Thesis, Nov. 2006, 1-169 (169 pages).

Wang, Yi-Ming, et al., "Range Unlimited Delay-Interleaving and -Recycling Clock Skew Compensation and Duty-Cycle Correction Circuit", IEEE Transactions on Very Large Scale Integration (VLSI) Systems, vol. 23, No. 5, May 2015, 856-868 (13 pages).

Won, Hyosup, et al., "A 28-GB/s Receiver With Self-contained Adaptive Equalization and Sampling Point Control Using Stochastic Sigma-Tracking Eye-Opening Monitor", IEEE Transactions on Circuits and Systems—I: Regular Papers, vol. 64, No. 3, Mar. 2017, 664-674 (11 pages).

International Search Report and Written Opinion for PCT/US2022/032287, dated Aug. 25, 2022, 1-12 (12 pages).

Cui, Delong, et al., "A Dual-Channel 23-Gbps CMOS Transmitter/Receiver Chipset for 40-Gbps RZ-DQPSK and CS-RZ-DQPSK Optical Transmission", IEEE Journal of Solid-State Circuits, vol. 47, No. 12, Dec. 2012, 3249-3260 (12 pages).

Inti, Rajesh, et al., "A 0.5-to-2.5 Gb/s Reference-Less Half-Rate Digital CDR with Unlimited Frequency Acquisition Range and Improved Input Duty-Cycle Error Tolerance", IEEE Journal of Solid-State Circuits, vol. 46, No. 12, Dec. 2011, 3150-3162 (13 pages).

Pozzoni, Massimo, et al., "A Multi-Standard 1.5 to 10 Gb/s Latch-Based 3-Tap DFE Receiver with a SSC Tolerant DDR for Serial Backplane Communication", IEEE Journal of Solid-State Circuits, vol. 44, No. 4, Apr. 2009, 1306-1315 (10 pages).

Shu, Guanghua, et al., "A 4-to-10.5 Gb/s Continuous-Rate Digital Clock and Data Recovery With Automatic Frequency Acquisition", IEEE Journal of Solid-State Circuits, vol. 51, No. 2, Feb. 2016, 428-439 (12 pages).

Yoo, Danny, et al., "A 36-Gb/s Adaptive Baud-Rate CDR with CTLE and 1-Tap DFE in 28-nm CMOS", IEEE Solid-State Circuits Letters, vol. 2, No. 11, Nov. 2019, 252-255 (4 pages).

Zaki, Ahmed M., "Adaptive Clock and Data Recovery for Asymmetric Triangular Frequency Modulation Profile", IEEE Pacific Rim Conference on Communications, Computers and Signal Processing (PACRIM), Aug. 21, 2019, 1-6 (6 pages).

\* cited by examiner

HORIZONTAL CENTERING OF SAMPLING POINT USING VERTICAL VERNIER

REFERENCES

The following prior applications are herein incorporated by reference in their entirety for all purposes:

U.S. Pat. No. 9,100,232, filed Feb. 2, 2105 as application Ser. No. 14/612,241 and issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi].

U.S. Pat. No. 10,193,716, filed Apr. 28, 2017, naming Ali Hormati and Richard Simpson, entitled "Clock Data Recovery Utilizing Decision Feedback Equalization", hereinafter identified as [Hormati I].

U.S. Pat. No. 10,848,351, filed Feb. 25, 2020, naming Ali Hormati, entitled "Sampler Offset Calibration during Operation", hereinafter identified as [Hormati II].

U.S. Pat. No. 10,904,046, filed Mar. 27, 2020, naming Ali Hormati, entitled "Variable Gain Amplifier and Sampler Offset Calibration without Clock Recovery", hereinafter identified as [Hormati III].

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods such as described in [Shokrollahi] have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At a receiver, the received signals corresponding to the codeword are transformed back into the original digital information representation space. Herein, this process is referred to as "decoding".

Regardless of the encoding method used, the received signals presented to the receiving device are sampled (or their signal value otherwise recorded) at intervals best representing the original transmitted values, regardless of transmission channel delays, interference, and noise. This Clock and Data Recovery (CDR) not only must determine the appropriate sample timing, but must continue to do so continuously, providing dynamic compensation for varying signal propagation conditions. It is common for communications receivers to extract a receive clock signal from the received data stream. Some communications protocols facilitate such Clock Data Recovery or CDR operation by constraining the communications signaling so as to distinguish between clock-related and data-related signal components. Similarly, some communications receivers process the received signals beyond the minimum necessary to detect data, so as to provide the additional information to facilitate clock recovery. As one example, a so-called double-baud-rate receive sampler may measure received signal levels at twice the expected data reception rate, to allow independent detection of the received signal level corresponding to the data component, and the chronologically offset received signal transition related to the signal clock component.

However, the introduction of extraneous communications protocol transitions is known to limit achievable data communication rate. Similarly, receive sampling at higher than transmitted data rate is known to substantially increase receiver power utilization.

Real-world communications channels are imperfect, degrading transmitted signals in both amplitude (e.g. attenuation) and timing (e.g. delay and pulse smearing) which may be addressed via transmitter pre-compensation and/or receive equalization. Continuous time linear equalization (CTLE) is one known approach to frequency domain equalization, in one example providing compensation for increased channel attenuation at high frequencies. Time-domain-oriented equalization methods are also used to compensate for the effects of inter-symbol-interference or ISI on the received signal. Such ISI is caused by the residual electrical effects of a previously transmitted signal persisting in the communications transmission medium, so as to affect the amplitude or timing of the current symbol interval. As one example, a transmission line medium having one or more impedance anomalies may introduce signal reflections. Thus, a transmitted signal will propagate over the medium and be partially reflected by one or more such anomalies, with such reflections appearing at the receiver at a later time in superposition with signals propagating directly.

One method of data-dependent receive equalization is Decision Feedback Equalization or DFE. Here, the time-domain oriented equalization is performed by maintaining a history of previously-received data values at the receiver, which are processed by a transmission line model to predict the expected influence that each of the historical data values would have on the present receive signal. Such a transmission line model may be pre-calculated, derived by measurement, or generated heuristically, and may encompass the effects of one or more than one previous data interval. The predicted influence of these one or more previous data intervals is collectively called the DFE compensation. At low to moderate data rates, the DFE compensation may be calculated in time to be applied before the next data sample is detected, as example by being explicitly subtracted from the received data signal prior to receive sampling, or implicitly subtracted by modifying the reference level to which the received data signal is compared in the receive data sampler or comparator. However, at higher data rates the detection of previous data bits and computation of the DFE compensation may not be complete in time for the next data sample, requiring use of so-called "unrolled" DFE computations performed on speculative or potential data values rather than known previous data values. As one example, an unrolled DFE stage may predict two different compensation values depending on whether the determining data bit will resolve to a one or a zero, with the receive detector performing sampling or slicing operations based on each of those predictions, the multiple results being maintained until the DFE decision is resolved.

BRIEF DESCRIPTION

A digital receiver system samples received signals in both amplitude and time, obtaining sufficient information to permit accurate detection and decoding of the transmitted data regardless of signal degradations induced by the communications medium. Addressing the particular characteristics of the communications medium may require signal amplification, frequency- and time-domain filtering, as well as accurate adjustment of both the time and amplitude at which sampling occurs.

Accurate setting of data sampler timing to maximize receive data integrity requires accurate measurement of the overall receive eye opening. However, in some system embodiments a determination of the overall extent of the eye opening may not be made directly, due to limitations in the adjustment range of sampler timing, threshold, or both.

Methods and systems are described for measuring a vertical opening of a signal eye of a pulse amplitude modulated (PAM) signal received over a channel to determine a vertically-centered voltage decision threshold of a sampler receiving a sampling clock, determining channel-characteristic parameters indicative of a frequency response of the channel, determining a correctional vernier value from the channel-characteristic parameters, and generating a horizontally-centered voltage decision threshold that introduces a horizontal sampling offset in the sampling clock in a direction closer to a horizontal center of the signal eye by combining the vertically-centered voltage decision threshold and the correctional vernier value.

DETAILED DESCRIPTION

Figure 1:
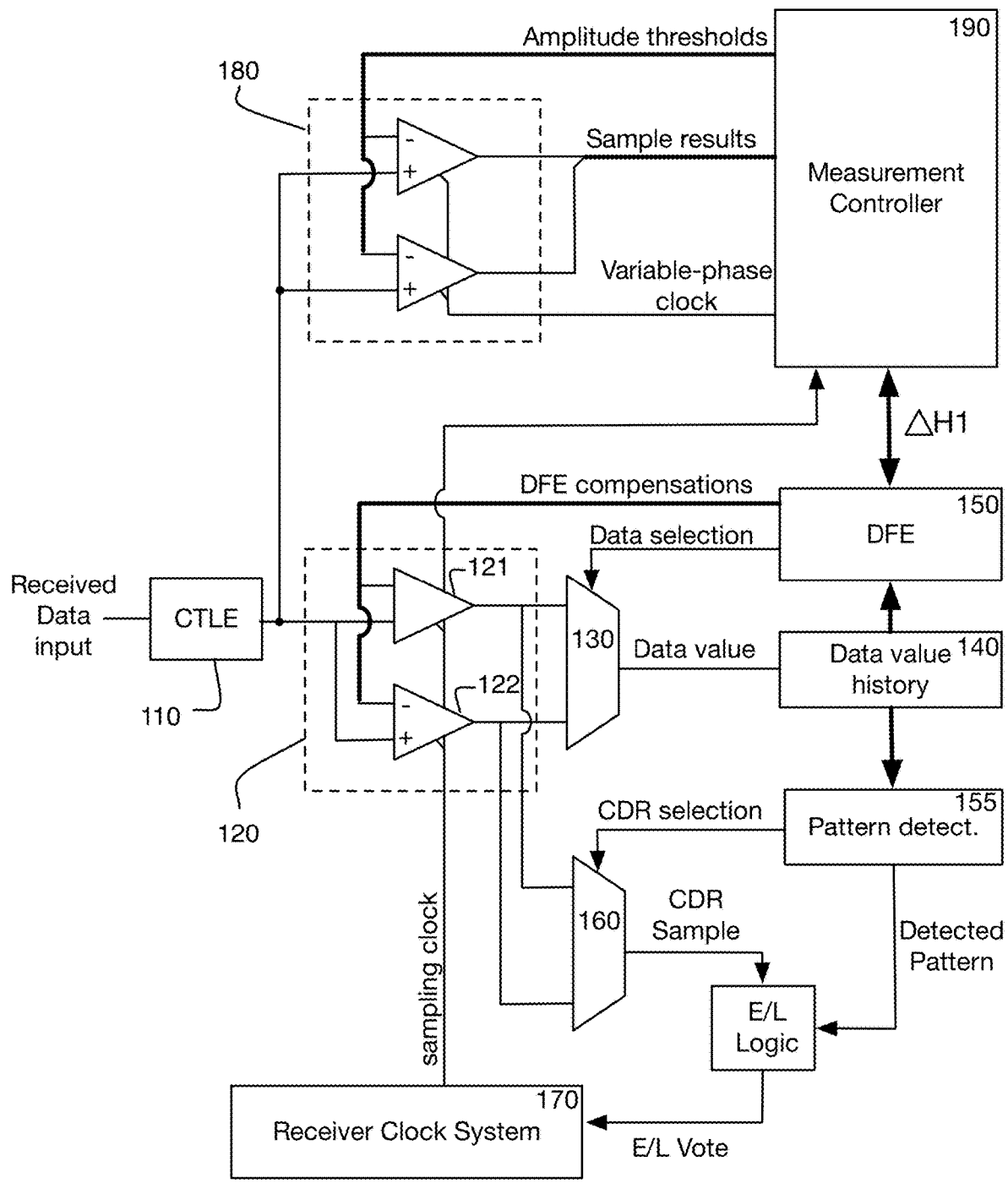
FIG. 1 is a block diagram of a receiver, in accordance with some embodiments.

In recent years, the signaling rate of high-speed communications systems have reached speeds of tens of gigabits per second, with individual data unit intervals measured in picoseconds. One example of such a system is given by [Shokrollahi], which describes use of vector signaling codes over extremely high bandwidth multiwire data communications links, such as between two integrated circuit devices in a system. Depending on the particular coding scheme used, the number of channels comprising such a communications link may range from two to eight or more, and may also communicate one or more clock signals, either within data channels or on separate communications channels.

In one embodiment utilizing a vector signaling code, multiple bits of data are encoded at the transmitter into a vector signaling "codeword", i.e. a set of symbols to be transmitted essentially simultaneously over the multiple wires or channels of the communication medium. As each such wire or channel may take on more than two possible values, each symbol of the codeword is drawn from an alphabet of allowable signal values; in examples of [Shokrollahi], alphabets of four and ten values are used in encodings of five data bits into six symbol codewords. In the receiver, the multilevel wire signals are detected to determine the received codeword, which is then decoded (e.g. by a mapping table lookup) into received data.

In an alternative embodiment, it is noted that each vector signaling codeword is a superposition of "subchannel" components, each such subchannel being an orthogonal mode or pattern of modulation of the wires or channels. Thus, in the example of [Shokrollahi], five subchannels may be summed to produce the transmitted signals, each subchannel modulated by one of the five transmitted data bits. Similarly, a vector signaling code receiver may directly detect the combination of received wire signals corresponding to a particular subchannel, as one example by using a multi-input comparator (MIC) performing a weighted summation of two or more wire signals correlated with the orthogonal mode of that subchannel, and directly producing one bit of received data. In the example of [Shokrollahi], full decoding of five data bits is shown using a set of MICs combining from two to six wire signals. As codeword and subchannel processing models are fully equivalent, interoperation is assured regardless of the particular encoding and decoding model used, e.g. allowing combination of a codeword transmitter with a MIC-based subchannel receiver based on the same orthogonal vector signaling code.

As previously mentioned, wire signals in an orthogonal vector signaling code system may take on multiple distinct values, while detected subchannel results (as one example, the results of weighted summation as at the output of a MIC) are typically binary, thus receive processing functions such as ISI reduction and skew correction may be performed more efficiently on the simpler subchannel signals rather than on the more complex wire signals.

Conventional practice for a high-speed integrated circuit receiver terminates each received signal channel, subchannel, or wire signal in a signal detector. This signal detector performs a measurement constrained in both time and amplitude dimensions; in one example embodiment, it may be composed of a sample-and-hold circuit that constrains the time interval being measured, followed by a threshold detector or digital comparator that determines whether the signal within that interval falls above or below (or in some embodiments, within bounds set by) a reference value. Alternatively, a digital comparator may determine the signal amplitude followed by a clocked digital flip-flop capturing the result at a selected time. In other embodiments, a combined time- and amplitude-detection circuit is used, measuring the amplitude state of its input in response to the specified timing of a clock transition.

For descriptive convenience, this document will use the term sampling device, or more simply "sampler" to describe the receiver component that obtains an input measurement, as it implies both the time and amplitude measurement constraints, rather than the equivalent but less descriptive term "slicer" also used in the art. Similarly, the sampler input will simply be described as the "received signal", whether it is derived from a wire signal, a MIC subchannel output, or other received information value. No limitation is implied by these descriptive conveniences, with all embodiments described herein being applicable to all signal sources and encodings.

In some embodiments, the time at which a sample is captured may be adjusted in some or all of the receiver samplers; in some embodiments, the threshold level to which a sample is compared may be adjusted in some or all of the receiver samplers. As one example, the well-known receiver "eye plot" diagram is typically obtained by iterative adjustment of these parameters, with the results plotted graphically as signal amplitudes over time.

Clock Data Recovery

Clock Data Recovery or Clock Data Alignment (CDR or CDA) circuits as in [Hormati I] extract timing information, either from the received signal(s) themselves or from dedicated clock signal inputs, and utilizing that extracted information to generate clock signals to control the time interval used by received signal sampling device. The actual clock extraction may be performed using well known circuits such as a Phase Locked Loop (PLL) or Delay Locked Loop (DLL), which in their operation may also generate higher frequency internal clocks, multiple clock phases, etc. in support of receiver operation. Implementation distinctions between CDR and CDA embodiments as described in the art are irrelevant to the present descriptions, thus the term CDA will subsequently be used herein as a generic identifier, without implying limitation.

In one common CDA embodiment, a first sample time is configured to optimally obtain the data sample, and a second sample time is configured to optimally determine whether the phase of the internal clock remains aligned with incoming signal transitions, which may be as much as 1% of a received signal unit interval (UI) offset in time from the optimum data sampling time. As sampling in such embodiments occurs twice per received unit interval, such systems are described as utilizing a double baud rate CDA. Such systems are very common in low speed communications system or where the received signal exhibits very sharp transitions, i.e. where there is significant displacement in time between observation of a signal transition and optimum sampling of data.

So-called single baud rate CDA embodiments are also known, in which the same sample time is used to obtain the data sample, and to determine whether the phase of the internal clock remains aligned with incoming signal transitions. In one such embodiment, inter-symbol interference (ISI) within the transmission medium, combined with group delay within the receive input processing, can result in detectable signal transitions which can inform CDA alignment at one sampling amplitude, while simultaneously detecting a stable data value at a second sampling amplitude.

CDA embodiments produce a single or primary sampling clock that provides a phase-locked sampling point for one or more data samplers. In some embodiments, the CDA generates early and late measurements and responsively adjusts the sampling instant to find a locked sampling instant representative of a desired ratio of early and late measurements. A CDA embodiment may also produce secondary clocks having predetermined phase relationships to the primary clock, as one example having ninety degree or quadrature offsets. In some embodiments, two such clocks may be input to phase interpolation (PI) circuits, allowing creation of additional phase-locked sampling points having a configurable phase relationship to the primary sampling clock and its associated data samplers.

Receive Signal Equalization

At high data rates, even relatively short and high-quality communications channels exhibit considerable frequency-dependent signal loss, thus it is common for data receivers to incorporate receive signal equalization. Continuous-time Linear Equalization (CTLE) is commonly used to provide increased high frequency gain in the receive signal path, in compensation for the increased high frequency attenuation of the channel.

It has also become common practice for data communications receivers to incorporate Decision Feedback Equalization (DFE) to compensate for signal propagation anomalies in the communications medium, including ISI. The DFE system performs non-linear time-domain equalization on the received signal by maintaining a history of previously-received data values at the receiver, and processing those historic data values with a transmission line model to predict the expected influence each of the historical data values would have on the present receive signal. Such a transmission line model may be pre-calculated, derived by measurement, or generated heuristically, and may encompass the effects of one or more than one previous data interval.

In a typical receiver design, this computed DFE compensation value will be subtracted from the current receive signal input to produce a corrected signal more accurately representing the received data value. Those familiar with the art will recognize that the DFE compensation value produced as described above cannot be calculated until the previous unit interval's data value has been detected. Thus, as data rates increase, a point will be reached at which the information to produce the DFE compensation value is not available in time to be applied to the next unit interval sampling. Indeed, at the highest data rates currently used in practice, this situation may exist for multiple previous unit intervals, as the detection time for a single data value may represent multiple unit interval durations, requiring the receiver to pipeline or parallelize the detection operation. Thus, it is common for embodiments to forgo such "closed loop" DFE methods for one or more of the most recent unit intervals, instead relying on an "open loop" or "unrolled loop" generation of one or more elements of the DFE compensation value for these most recent unit intervals.

In an effort to accelerate such DFE operation, some embodiments speculatively produce DFE compensation values corresponding to each of the possible detected data values for a given unit interval. One embodiment incorporates multiple data detection samplers, each provided with a distinct value of DFE compensation associated with the possible detected data values for one or more previous unit intervals. The result of each sampler is stored until the previous data value is known, at which time the corresponding stored result is selected for data detection.

The set of DFE compensation values speculatively created to represent the constellation of potential detected data results over the previous transmit unit interval or intervals represent a set of measurement levels spanning some portion of the receive signal amplitude range. As an example, previous transmission of consecutive "zero" signals might lead to a predicted lower threshold level for a subsequent receiver data measurement incorporating speculative DFE compensation, while previous transmission of consecutive "one" signals might lead to a predicted higher threshold level for the same data measurement. Thus, for any data measurement used to detect an actual data value, the described multiple-sampler receiver will potentially perform measurement operations using thresholds either too high or too low for the actual signal during that interval.

CDA Combined with DFE

In high speed communications systems operating over channels with significant frequency-dependent attenuation, received signals often have significantly sloped rise and fall times, even after receive signal equalization. Thus, a signal sampler timed to trigger at "center of eye" may under some circumstances still intersect with a signal transition still transitioning from one data value to the next, especially if that received signal is significantly perturbed by ISI. One such example may be seen in FIG. 3, where the sampling point marked by "+" intersects with the signal trajectory identified as [0,1,1]. A receiver incorporating DFE will compensate for this behavior by having its effective data sampling threshold adjusted to be further away from the signal trajectory, while a fixed-threshold sampler (i.e. one not obtaining the benefit of DFE) might detect an incorrect value.

In such environments, it is possible to utilize a single sample time per received unit interval to determine both data value and clock phase. These baud-rate CDA embodiments rely on the observation that certain combinations of received ISI and detection sampling threshold have sub-optimal data sampling characteristics; that is, they have a high probability of intersecting with a changing input signal having a slow rise and fall time. Thus, by controlling the receive equalization to constrain transition rates, and then restricting observation of clock timing to only those sampling thresholds and received data patterns (which correlate to particular ISI levels) that provide such intersections, a single sampling time may be utilized for both clock and data sampling.

One embodiment described in [Hormati I] takes advantage of this effect to utilize measurement operations from multiple samplers or comparators performing speculative DFE operations. In that embodiment, a stored speculative result not used for determining the received data value (that is, measured at a signal offset above or below the appropriate DFE correction for that interval, but at the same time as the valid data sample) provides information relating to clock recovery. It should thus be noted that as speculative decisions that do not correspond to data in a given unit interval may be used for clock recovery (after being pattern-verified as occurring during a transition), the locked sampling point of the sampling clock follows the transitioning signal traces shown e.g., in FIG. 3, as the clock recovery system is attempting to achieve an approximate 50-50 ratio of early and late votes generated using the outputs of the data samplers. Specifically, as the voltage value of the voltage decision thresholds $V_{+H1}$ and $V_{-H1}$ are increased and decreased, respectively (i.e., moved away from the vertical center of the peak-to-peak signal swing), the locked sampling point will move horizontally to the right. Similarly, as the voltage value of the voltage decision thresholds $V_{+H1}$ and $V_{-H1}$ are decreased and increased, respectively (i.e., moved closer to the vertical center of the peak-to-peak signal swing), the locked sampling point will move horizontally to the left.

Example Embodiment

For purposes of description and without implying limitation, a serial data receiver as shown in FIG. 1 will be used as an example. This example receiver includes at least one stage of speculative DFE generated by DFE circuit 150 supported by a first phase 120 of data samplers 121/122 performing concurrent time-sampling operations at two different amplitude thresholds, and a receiver clock system 170 to produce a sampling clock, the phase of which may be adjusted by a CDR correction to optimize data sampling timing. As shown, the data samplers 121 and 122 have voltage decision thresholds that are determined in part by speculative DFE terms provided by DFE circuit 150. The DFE circuit 150 may be configured to generate a vertically-centered voltage decision threshold for the data samplers as an initialization point. The vertically-centered voltage decision threshold may correspond to a speculative DFE term that is equidistant from the top and bottom of the signaling eye when the CDR is in a locked condition. The data samplers generate outputs by slicing the data signal received from CTLE 110 according to their respective voltage decision thresholds and sampling the decision according to the sampling clock. Before sampling, the received data signal may be amplified and/or equalized by CTLE 110. In some embodiments, the receiver system of FIG. 1 may include additional processing phases similar to that of 120, however for simplicity only one is shown. Additionally, FIG. 1 includes data history 140 which may be, for example, a shift register-type buffer, and a pattern detection circuit 155 configured to detect one or more predetermined transitional data patterns. FIG. 1 further includes a measurement controller 190 for configuring the spare samplers 180 to make non-intrusive eye measurements, and may provide ΔH1 voltage offsets to apply to the H1 speculative DFE term generated by DFE circuit 150. In some embodiments, the ΔH1 may be an adjustment to initialize the H1 terms generated by DFE circuit 150 to be vertically-centered, and subsequently the ΔH1 term may correspond to the correctional vernier value to be applied to the vertically-centered voltage decision threshold.

Figure 5:
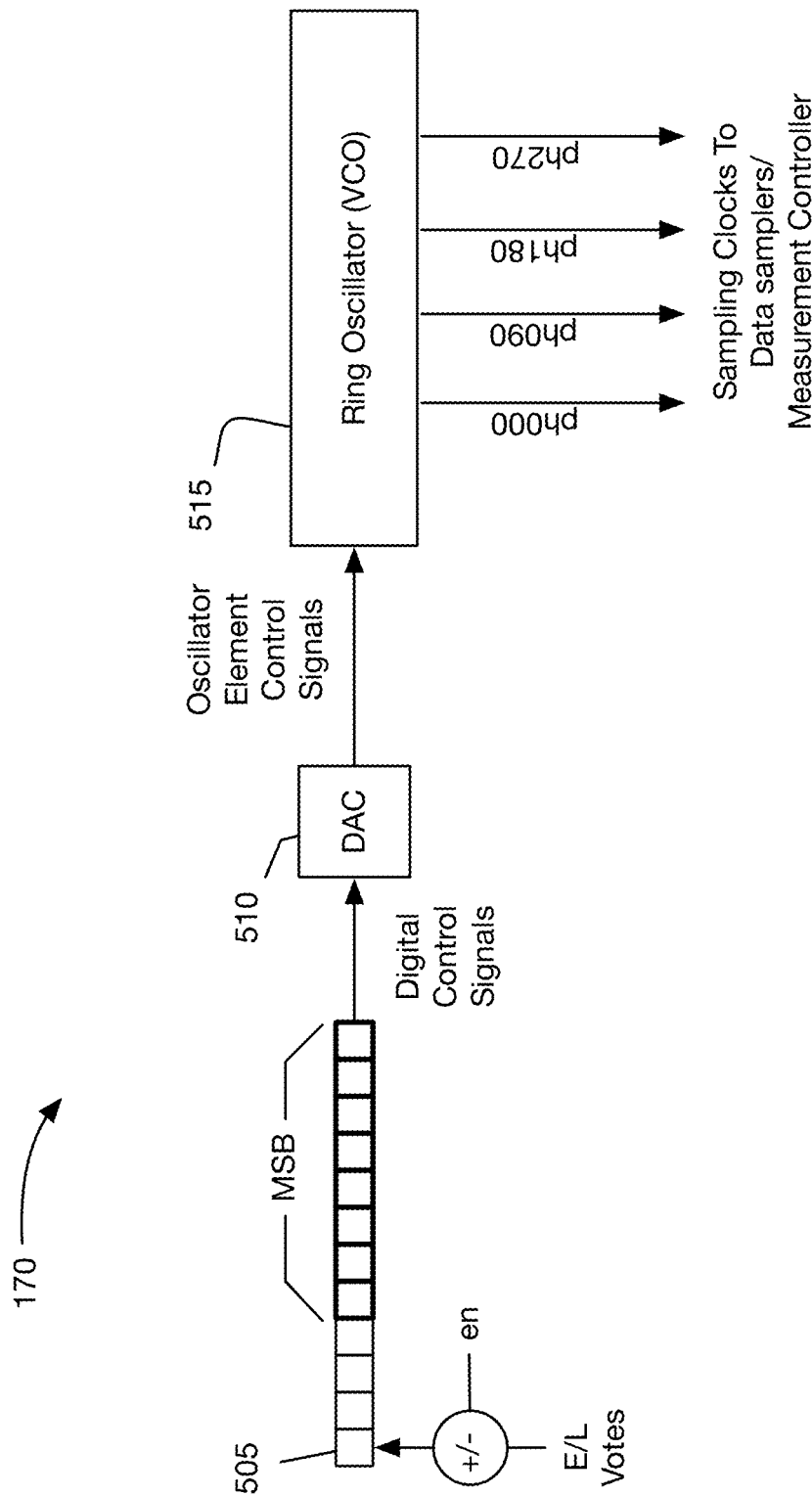
FIG. 5 is a block diagram of a receiver clock system, in accordance with some embodiments.

FIG. 5 is a block diagram of one receiver clock system 170, in accordance with some embodiments. As shown, early-late votes selected by multiplexer 160 are accumulated in a least-significant bit (LSB) portion of a multi-bit register 505. The value of the CDR sample selected via multiplexor 160 may be combined with the data pattern identified by pattern detection circuit 155 to generate an early-late vote. Each early-late votes may adjust the value of the multi-bit register 505 in directions as determined by the value of the early-late vote, or provide no change if there is no valid early-late vote for a given signaling interval. For example, an early-late vote having a value associated with "early" may increment the LSB while early-late votes having values associated with "late" may decrement the LSB, or vice-versa depending on the implementation. Each CDR sample may be validated by the pattern detection circuit 155 to determine that the CDR sample was taken during a valid transitional data pattern, thus qualifying the early-late vote generated by E/L logic as a valid early-late vote. In some embodiments, pattern detection circuit 155 may provide an enable signal to the receiver clock system 170 to enable updating of the LSB of multi-bit register 505. The multi-bit register 505 further includes a most-significant bit (MSB) portion (bolded) that may correspond to a multi-bit digital control signal for the local oscillator 515. As shown, the MSB portion is separated from the LSB portion by a number of positions to provide filtering. Furthermore, FIG. 5 includes a digital-to-analog converter (DAC) 510 configured to convert the multi-bit digital control signals to e.g., analog oscillator element control signals. Such analog control signals may control e.g., the operating currents of cascaded transistor elements in a ring oscillator. Other implementations known to those of skill in the art may be used as well. Outputs of ring oscillator 515 may be provided to data samplers 121/122, and additionally may be provided to one or more phase interpolators (not shown), one of which may be included in measurement controller 190 for generating a variable-phase adjusted clock for spare sampler 180. The receiver clock system 170 shown in FIG. 5 illustrates only one possible embodiment, and other alternative embodiments may be utilized as well.

FIG. 1 further includes a spare sampler 180 configured to provide additional measurement capability that is non-intrusive with respect to generation and processing of data and CDR samples gathered by data samplers 121 and 122. While FIG. 1 includes two spare samplers 180, it should be noted that such an embodiment should not be considered as limiting, and spare samplers 180 might include a single spare sampler, or more than two spare samplers. In one such embodiment, one or more spare samplers 180 may be configured to gather eye scope data, using Amplitude threshold(s) and/or a variable-phase adjusted clock. Such a variable-phase adjusted clock may be generated using e.g., a phase interpolator within measurement controller 190 that is configurable to receive phase(s) of the sampling clock from receiver clock system 170 and to generate a variable-phase adjusted clock that moves horizontally around the sampling interval. Alternatively, spare samplers may be configured to receive the sampling clock provided to data samplers 121/122 that corresponds to the center-of-eye sampling instant. A clock selection circuit (not shown) may be used to select between two such clocks. Measurement controller 190 may be further configured to adjust a vertical threshold of the spare sampler. As will be described in more detail below, such adjustments may be made to perform non-intrusive measurements of signal amplitude trajectory of a pattern-verified signal to adjust the locked sampling point of the data samplers 121/122.

Figure 2:
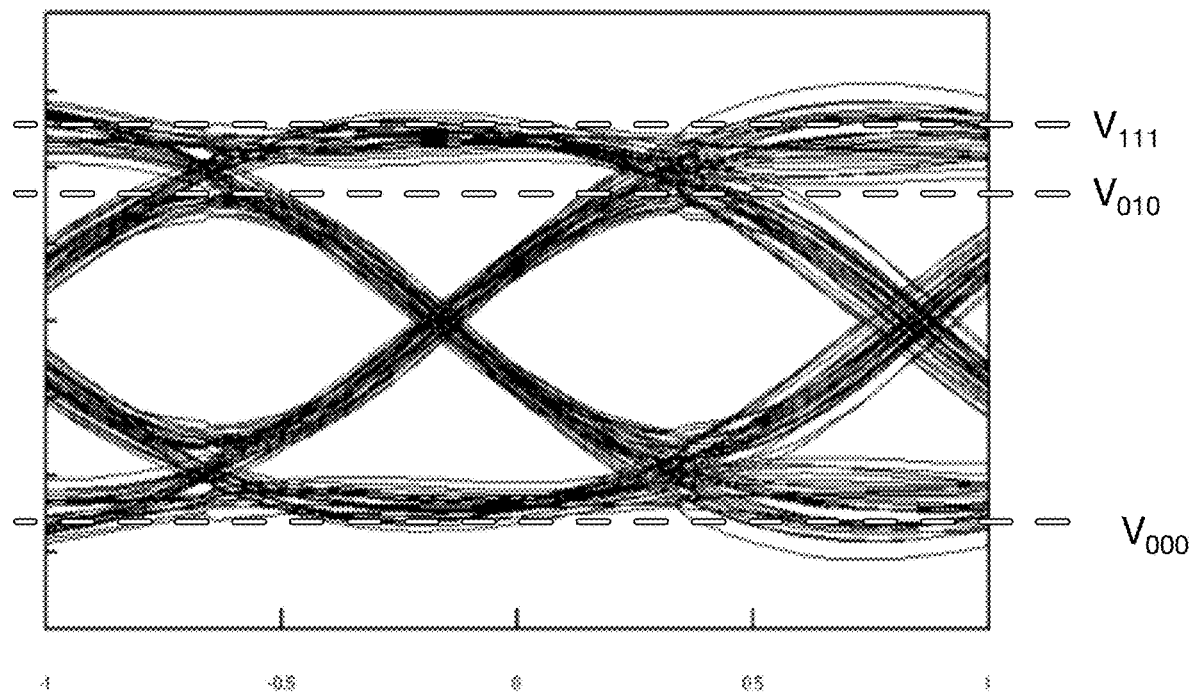
FIG. 2 shows an example receive signal as an eye diagram.

FIG. 2 is an example of a typical receive signal "eye", produced by a time-overlay of the receive signal over multiple unit intervals. Thus, each individual line comprising the eye represents the receive signal "trajectory", as it spans two or more unit intervals.

Figure 3:
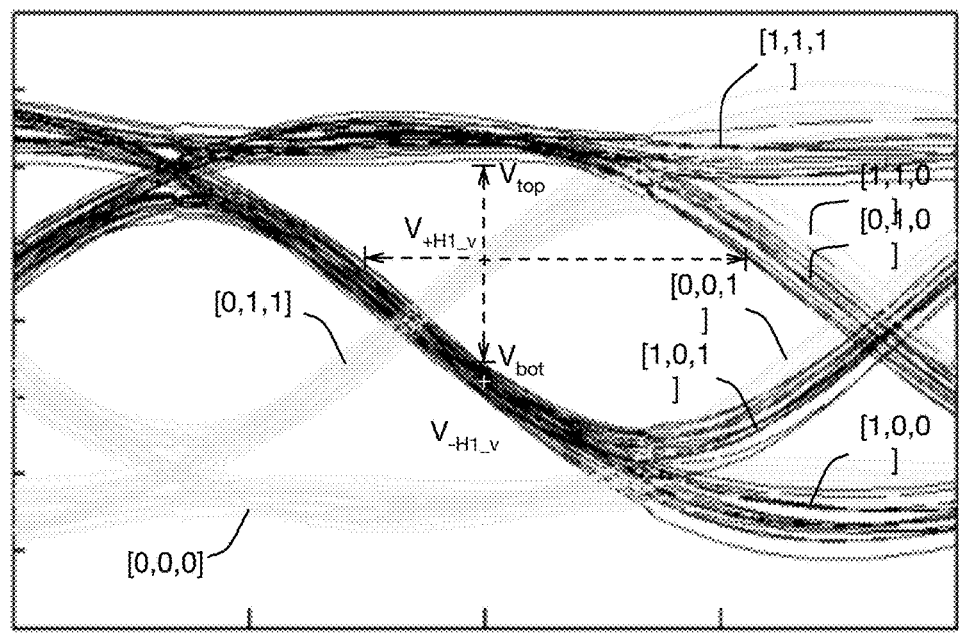
FIG. 3 shows determination of a vertically-centered voltage decision threshold

In FIG. 3, subsets of signal trajectories comprising the eye of FIG. 2 are labeled using a triplet notation of [previous data value, current data value, subsequent data value]. For descriptive convenience, this notation may be extended to incorporate additional previous and/or subsequent unit intervals, collectively described as the transitional data pattern associated with a particular measurement or action.

As would be expected, the [1, 1, 1] trajectories in FIG. 3 are clustered along the top of the graph, the [1, 1, 0] trajectories transition downward at the right of the graph, [0, 0, 1] transition upward at the right of the graph, etc. Trajectories corresponding to a previous received data value of "1" (thus, optimally detected by the upper DFE sampling location) are shown as bold lines, while those trajectories corresponding to a previous received data value of "0" (and thus optimally detected by the lower DFE sampling location) are shown as pale lines.

Figure 4:
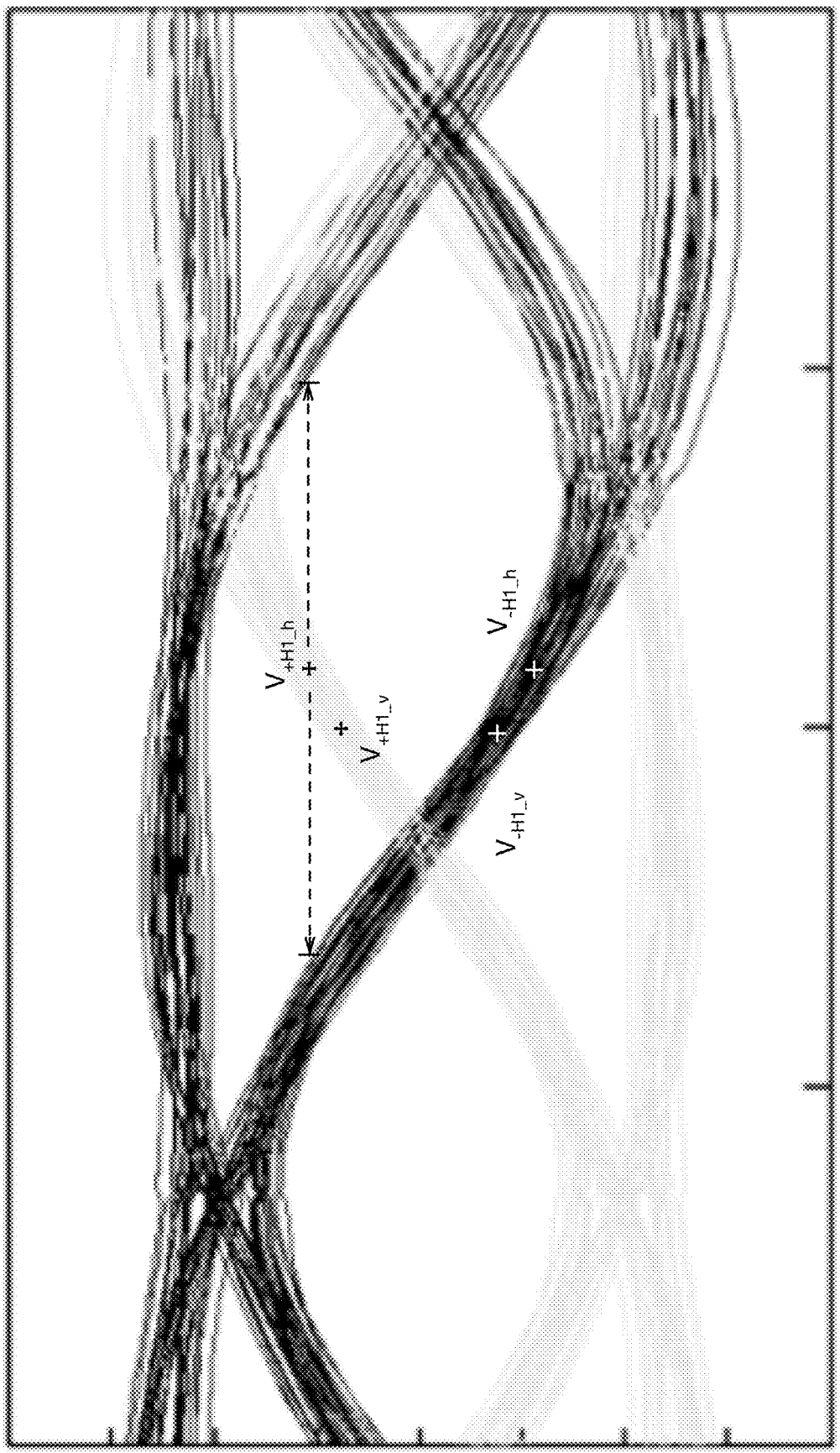
FIG. 4 show a horizontally-centered voltage decision threshold by application of a correctional vernier value to the vertically-centered voltage decision threshold of FIG. 3, in accordance with some embodiments.

The upper DFE sampler location selected by a DFE system to detect the current data value if the previous data value was "1" is shown with the black symbol + labeled "$V_{+H1\_v}$". It may be noted that this sampler location is well positioned in the center of the upper data eye, but also is directly over the trajectory of a [0,1,1] received signal (the current data value of which will be detected by the lower sampler location, as determined by the previous data value of "0".) Thus, the sampler having the decision threshold set to "$V_{-H1\_v}$" (indicated by the white + symbol), effectively corresponds to an edge sample that may be utilized by the CDR system to determine whether the sampler timing is early or late relative to that signal transition. As described above, use of sampler outputs as early-late indications causes the sampling clock to have a lock point associated with the DFE correction factors ±VH1, as the CDR will adjust the phase of the sampling clock until the early-late indications selected from the data samplers responsive to the transition data patterns are approximately a 1:1 ratio. As shown in FIG. 3, $V_{+H1\_v}$ (and $V_{-H1\_v}$) are determined to be vertically-centered voltage decision thresholds. In at least one embodiment, a "vertically-centered voltage decision threshold" is a voltage decision threshold that is equidistant from the top and bottom of a signaling eye. In some embodiments, the "signaling eye" may be pattern-specific, and may not necessarily correspond to a peak-to-peak voltage swing of the PAM signal. FIG. 3 specifically outlines a pattern-specific signaling eye associated with a previous bit being '1' (thus the $V_{+H1\_v}$ decision threshold is used to slice the data). The top of the signaling eye shown in FIG. 3 corresponds to a [1, 1, 1] pattern, while the bottom of the signaling eye is associated with a 1-to-0 transition ([1,0,0], [1,0,1] data patterns). As shown in FIG. 3, the $V_{+H1\_v}$ voltage decision threshold is vertically equidistant from the top and bottom of the signaling eye. As described above, the vertically-centered voltage decision threshold may be generated by DFE circuit 150 based on adjustments determined by the measurement controller 190. Specifically, DFE circuit 150 may determine a speculative H1 DFE term, and the spare samplers 180 may measure the top and bottom of the signal trace (see FIG. 3 for the +H1 signaling eye) to determine whether or not the speculative H1 DFE term is equidistant from the top and bottom of the signal trace. If there is an imbalance (e.g., the distance to the top of the signaling eye is greater than the distance to the bottom of the signaling eye) then the measurement controller may provide ΔH1 to the DFE circuit 150 to adjust the speculative H1 DFE term to be larger, and the process may repeat until the spare samplers determine the top and bottom of signaling eye are equidistant (or within a threshold thereof). Alternative embodiments may include the functionality of generating such a vertically-centered voltage decision threshold 150 without need of input from measurement controller 190. Embodiments described below may utilize the vertically-centered voltage decision threshold as a starting point, and may apply a correctional vernier value to obtain a horizontally-centered voltage decision threshold that results in a sampling point that is in the horizontal center of the signaling eye. The horizontally-centered voltage decision threshold is illustrated in FIG. 4. In the following description, the term "horizontally-centered" does not necessarily mean precisely in the horizontal center of the signal eye, rather a point that is more "horizontally-centered" (closer to the horizontal center of the eye) than the vertically-centered voltage decision threshold.

Dynamic Data Sampler Decision Threshold Adjustment

As previously mentioned, reliable and error-free detection of received data signals may include accurate adjustment of a data sampler threshold at a predetermined time and amplitude position within the receive signal "eye". Drift of that predetermined sampler vs. signal relationship over time, temperature, or supply voltage can lead to an increased receive bit error rate, and ultimately detection failure.

One known solution calibrates and adjusts a spare sampler offline (i.e. in a nonintrusive manner) and then exchanges that preconfigured unit with the active data sampler, freeing it to be calibrated and adjusted. In such a system, switching circuitry must be provided to all signals entering, controlling, and output by the samplers so that they may be directed as required to either data path or calibration functions.

To avoid use of such switching circuitry, one embodiment performs measurements using a spare sampler operating outside of a data signal processing path, and then uses information obtained through such measurements to adjust operation of the data samplers operating in the data signal processing path in a nonintrusive manner, as described in [Hormati II]. As the spare sampler is not part of the active data signal processing path, threshold levels and clock timing may be adjusted without impacting received data, allowing identification of both the extremes of normal operation (i.e. the boundaries of the received "eye" opening). In some embodiments, such adjustments to the spare sampler are comparable to those used to obtain the statistical data required to plot an eye diagram, and thus that spare sampler may subsequently be referred to as an eye sampler hereinafter, without implying limitation.

Ideally, the locked sampling point for the data samplers is set to the mid-point of the maximum horizontal eye opening, which may correspond to a known signaling interval duration. (In embodiments using predictive or speculative DFE, as in these examples, the eye openings being measured are those associated with the anticipated data value detected by each sampler, e.g. the extent of a valid data "1" for the upper sampler or a valid data "0" for the lower sampler.) In one representative embodiment, this point is determined by first advancing then retarding the sample timing of a sampler (as one example, by adjusting a phase interpolator (PI) producing a secondary or phase-adjustable clock controlling the sample time of a spare sampler) to determine the extent of the eye opening, then calculating the mid-point of those timing extremes. However, due to the unavoidable adjustment nonlinearities of an uncalibrated clock interpolator, simply averaging the two setting values is not sufficient. Thus, some embodiments described herein determine a correctional vernier value to be applied to a vertically-centered voltage decision threshold to obtain a horizontally-centered voltage decision threshold, wherein the correctional vernier value is based on channel characteristic parameters.

The vertical threshold voltage and the phase interpolator (PI) control values of the spare sampler determining the timing of each measurement may be configured by a dedicated measurement controller or processor, as in 190 of FIG. 1. In various embodiments, this measurement controller/processor 190 may be implemented as a finite state machine controlled by hardware logic, a sequence of discrete commands executed by a programmable controller, or as a software program executing on an embedded or general-purpose processor. Thus, in various embodiments the configuration, information gathering, and analysis components these measurements may be performed using different combinations of on-chip hardware, embedded software, and host-based software resources, without limitation.

Figure 7:
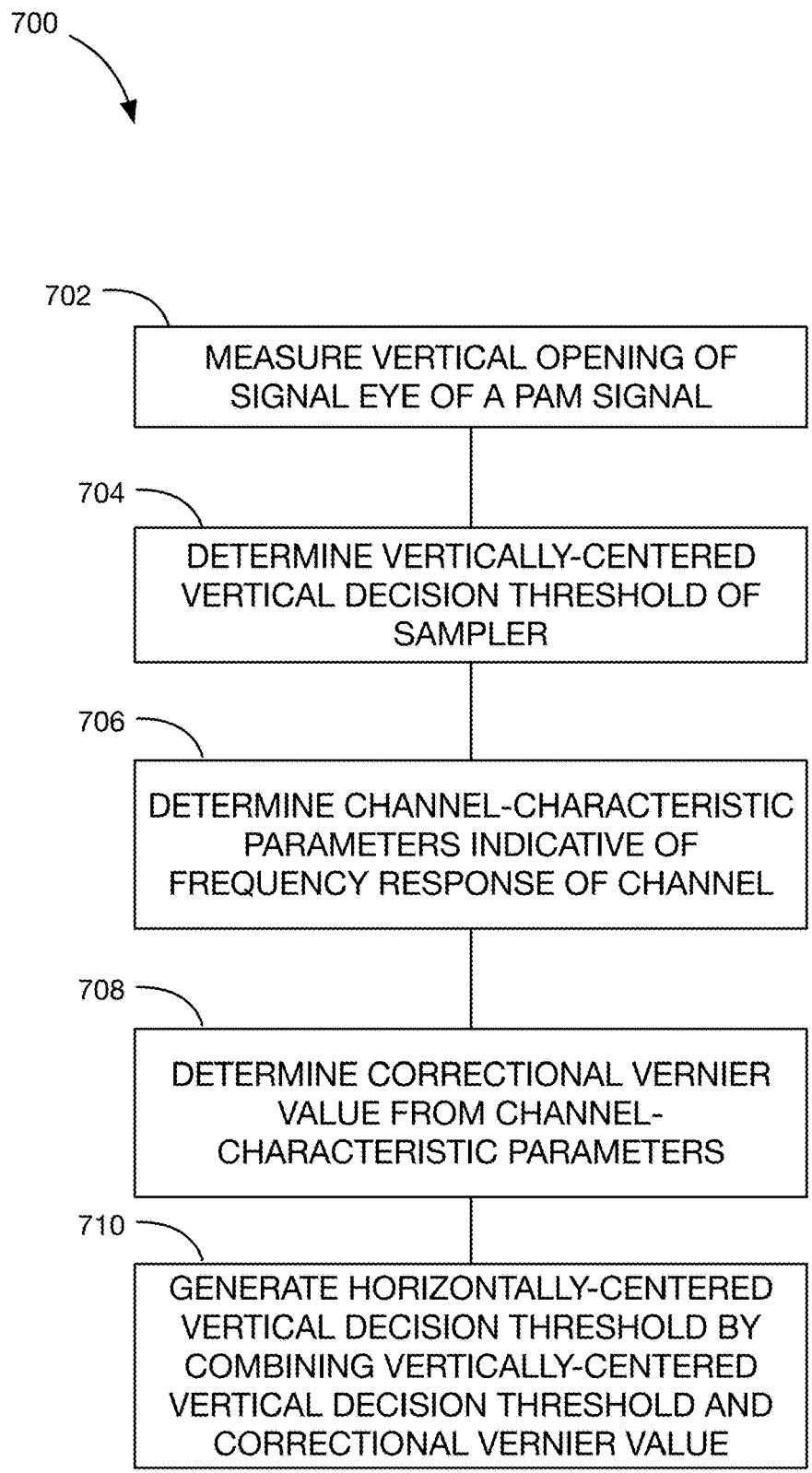
FIG. 7 is a flowchart of a method 700, in accordance with some embodiments.

FIG. 7 is a flowchart of a method 700, in accordance with some embodiments. As shown, method 700 includes measuring 702 a vertical opening of a signal eye of a pulse amplitude modulated (PAM) signal received over a channel to determine 704 a vertically-centered voltage decision threshold of a sampler receiving a sampling clock. In some embodiments, measuring the vertical opening of the signal eye includes measuring a top of the signal eye and a bottom of the signal eye, and the vertically-centered voltage decision threshold corresponds to a voltage level that is equidistant from the measured top and the bottom of the signal eye. As shown in FIG. 3, the vertically-centered voltage decision threshold $V_{+H1\_v}$ is equidistant from the top-of-eye signal trace ($V_{top}$) and bottom-of-eye signal trace ($V_{bot}$). As further shown in FIG. 3, the signal eye may be pattern-specific, and wherein at least one of the top and bottom of the signal eye is associated with a transition. Specifically shown in FIG. 3, for a previous bit equals '1', the bottom of the signal eye is associated with a 1-to-0 transition. Similarly, for a previous bit equals '0', the top of the signal eye is associated with a 0-to-1 transition. In such embodiments the vertically-centered voltage decision threshold may correspond to a speculative DFE term (+H1 or −H1).

As the signal eye may be pattern specific, and as the sampling instant is determined based on the +H1 and −H1 speculative DFE terms as described above, at least one embodiment determines the vertically-centered voltage decision threshold through trial and error. In one such embodiment, the vertically-centered voltage decision threshold may determined by setting a $^+H1$ value (and corresponding $^-H1$ value) using e.g., DFE circuit 150, and then using spare samplers 180 to determine $V_{top}$ and $V_{bot}$ associated with the set $^+H1$ value. Measurement controller 190 may then determine if $V_{top}$-$^+H1$ is equal to (or within a predetermined threshold) $^+H1$-$V_{bot}$. If $V_{top}$-$^+H1$>$^+H1$-$V_{bot}$, then the value of $^+H1$ is increased, and the process repeats. Contrarily, if $V_{top}$-$H1$<$^+H1$-$V_{bot}$, then the value of $^+H1$ is decreased, and the process repeats. It may be observed that every time $^+H1$ is increased or decreased, that the corresponding $^-H1$ value is decreased/increased by the same amount to maintain +/−H1 values that are equidistant from the vertical middle of the peak-to-peak voltage swing of the PAM signal.

The method further includes determining 706 channel-characteristic parameters indicative of a frequency response of the channel, and determining 708 a correctional vernier value from the channel-characteristic parameters. In some embodiments, the channel-characteristic parameters correspond to transceiver control codes. In one such embodiment, the processor 630 in the measurement controller depicted in FIG. 6 may obtain one or more of: feed-forward equalization (FFE) settings from the transmitter, continuous time linear equalizer (CTLE) settings from the receiver, and bandwidth limit control settings for the receiver. Transceiver control codes as mentioned above may be indicative of channel loss, i.e., the slope of the transitions. For lossy channels, the transitions will have less, more horizontal slope and for less-lossy channels, the transitions will have more, steeper slope. For lossy channels, the correctional vernier value will be less than compared to less-lossy channels. In some embodiments, the transceiver control codes may be provided to a look-up table in processor 630, which may output the correctional vernier value based on the provided codes. The correctional vernier value may correspond to a voltage, that when added to the vertically-centered voltage decision threshold, results in a horizontally-centered voltage decision threshold as shown in FIG. 4.

At least one embodiment determines the channel-characteristic parameters via direct measurements of the PAM signal. In some such embodiments, determining the channel-characteristic parameters includes determining a difference in the low-frequency components of the PAM signal (and may be referred to herein as a voltage swing from Viii to $V_{000}$), and a peak signal amplitude for a transitional data pattern $V_{010}$, as shown in FIG. 2. Using these measurements, the processor 630 may determine the correctional vernier value from a computation of the measurements. In one non-limiting example, the processor determine the correctional vernier value based on (i) a ratio between the peak signal amplitude of the transitional data pattern $V_{010}$ and one of the low-frequency components $V_{111}$ or $V_{000}$ of the PAM signal and (ii) the voltage swing $V_{111}$-$V_{000}$. In such embodiments, $$\frac{V_{010}}{v_{111}} \text{ or } \frac{V_{010}}{v_{000}}$$

may be indicative of the amount of slope in the transition, while the voltage swing $V_{111}$-$V_{000}$ is reflective of a scalar measurement that determines how much of a horizontal timing offset corresponds to a particular amount of voltage of the correctional vernier value.

Figure 8:
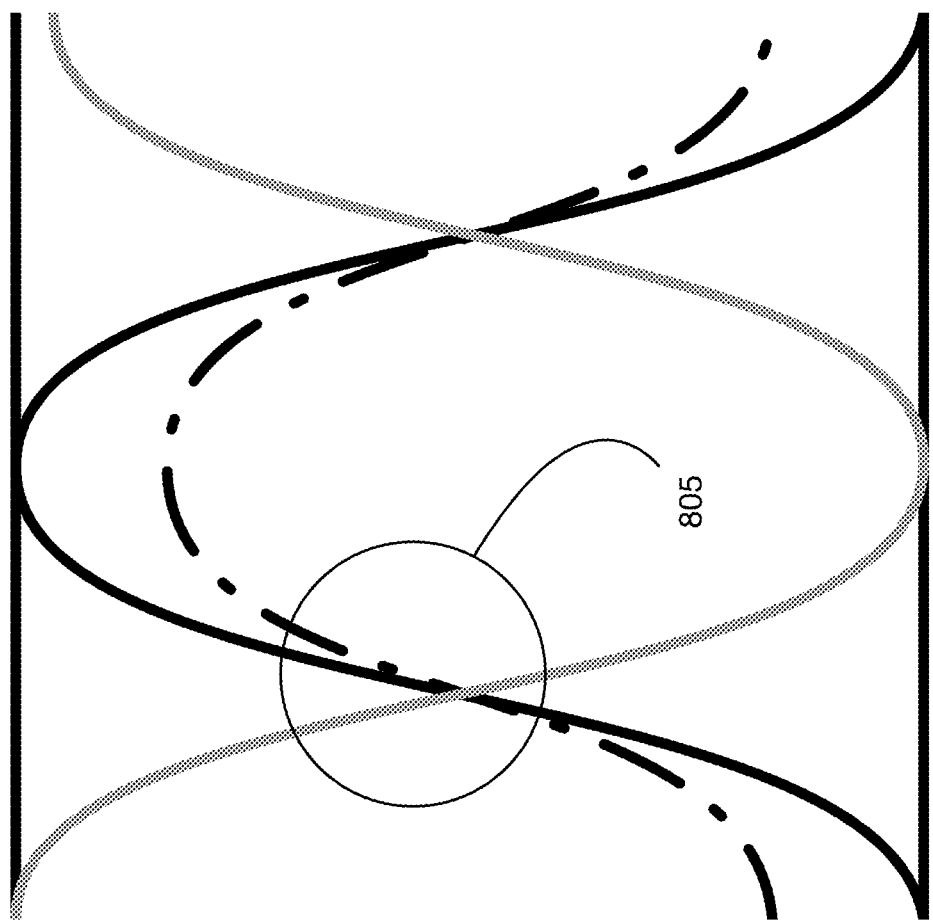
FIG. 8 depicts a waveform of a transitional data pattern for various channel-characteristic parameters, in accordance with some embodiments.
Figure 9:
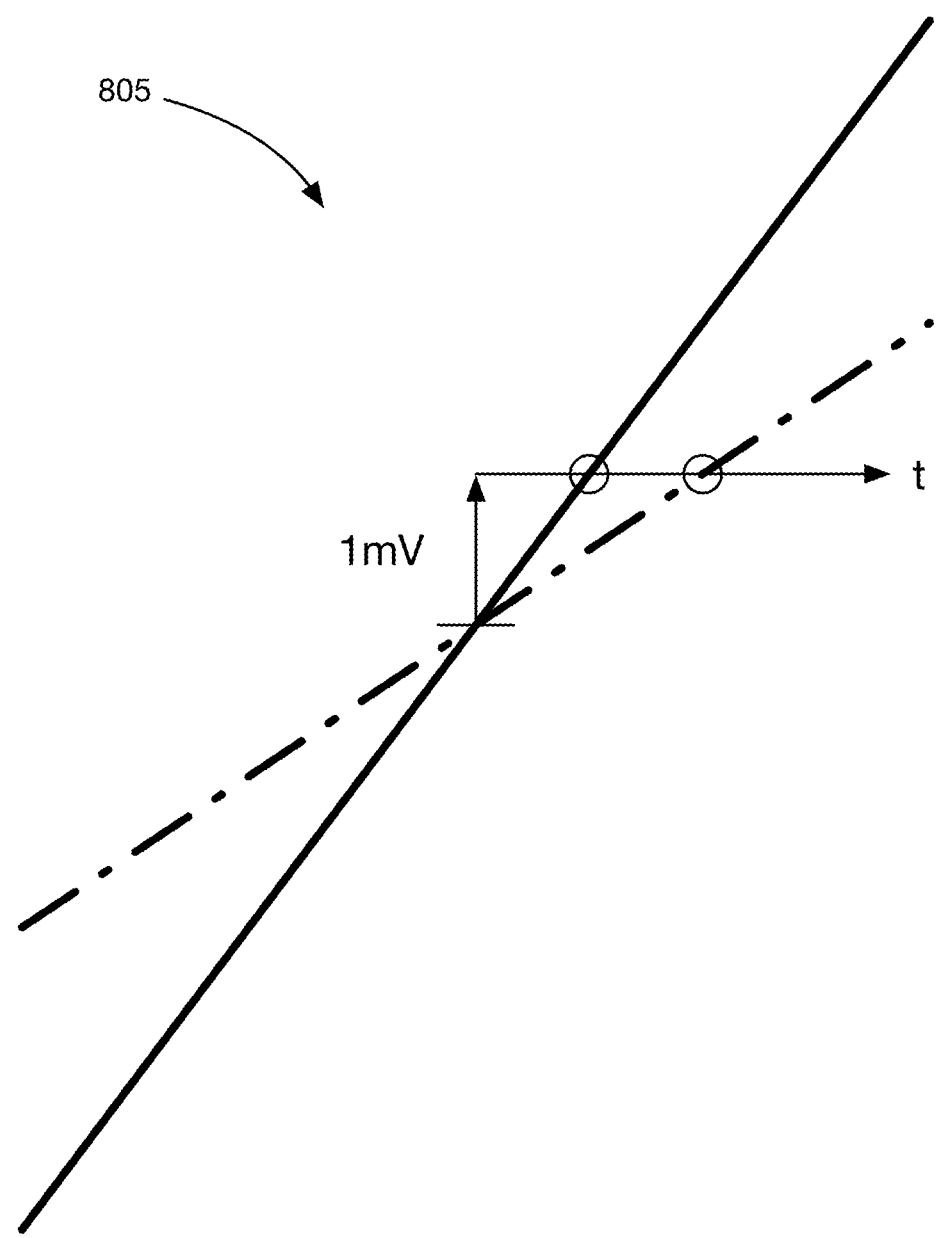
FIG. 9 depicts the relationships between correctional vernier and channel-characteristic parameters, in accordance with some embodiments.

FIG. 8 illustrates [0,1,0] transitions for two particular channels, where the solid line is the case of a low-loss channel and the dotted line is the case of a high-loss channel. As described above, the locked sampling point follows the voltage decision threshold of the data samples as the non-decision sampling result for a given sampling interval may be used as an early-late vote in the presence of a signal transition. Thus, adjustments to the voltage decision threshold will induce a horizontal offset in the locked sampling point of the sampling clock. In some embodiments, as the ratio of $$\frac{V_{010}}{v_{111}}$$

approaches '1', the higher amount of slope in the transition, and thus each nominal amount (e.g., each mV) of correctional vernier applied to the vertically-centered voltage decision threshold induces a relatively small amount horizontal offset. Thus, in low-loss channels with steep transitions, the processor 630 may determine relatively larger correctional vernier values to determine the horizontally-centered voltage decision threshold. Similarly, as the ratio of $$\frac{V_{010}}{v_{111}}$$

decreases (i.e., less than '1'), the transition will have a more gradual slope, and thus each mV of correctional vernier induces a relatively larger amount of horizontal offset in the locked sampling point. Thus, in such high-loss channels, processor 630 may determine relatively smaller correctional vernier values to generate horizontally-centered voltage decision thresholds. As described above, the voltage swing $V_{111}$-$V_{000}$ may be used to provide a scale, and combined with the slope determined based on the ratio above may be used to generate the correctional vernier value. FIG. 9 is a zoomed in section 805 of FIG. 8 to illustrate the effect each mV of correctional vernier has on the horizontal timing offset, depending on channel-characteristic parameters. Similar to FIG. 8, the solid line represents the low-loss channel-characteristic parameters and the dotted line represents the high-loss channel-characteristic parameters. As shown, the high-loss case yields a larger horizontal offset per mV than the low-loss case.

While embodiments above describe use of a [0, 1, 0] transitional data pattern, similar embodiments may utilize other transitional data patterns, such as [1,0,1], [0,1,1], or [1,0,0]. In further embodiments, quadruplet patterns such as [0,1,0,0], [1,0,1,1], [0,1,0,1], [1,0,1,0], etc. may be used, depending on the desired channel-characteristic parameters. Furthermore, it should be noted that in some cases the ratio $$\frac{V_{010}}{v_{111}}$$

should not be constrained by '1', and may in fact be larger than '1' (e.g., in cases of high amounts of high frequency peaking), and in such cases the slope of the transition is further increased.

Figure 6:
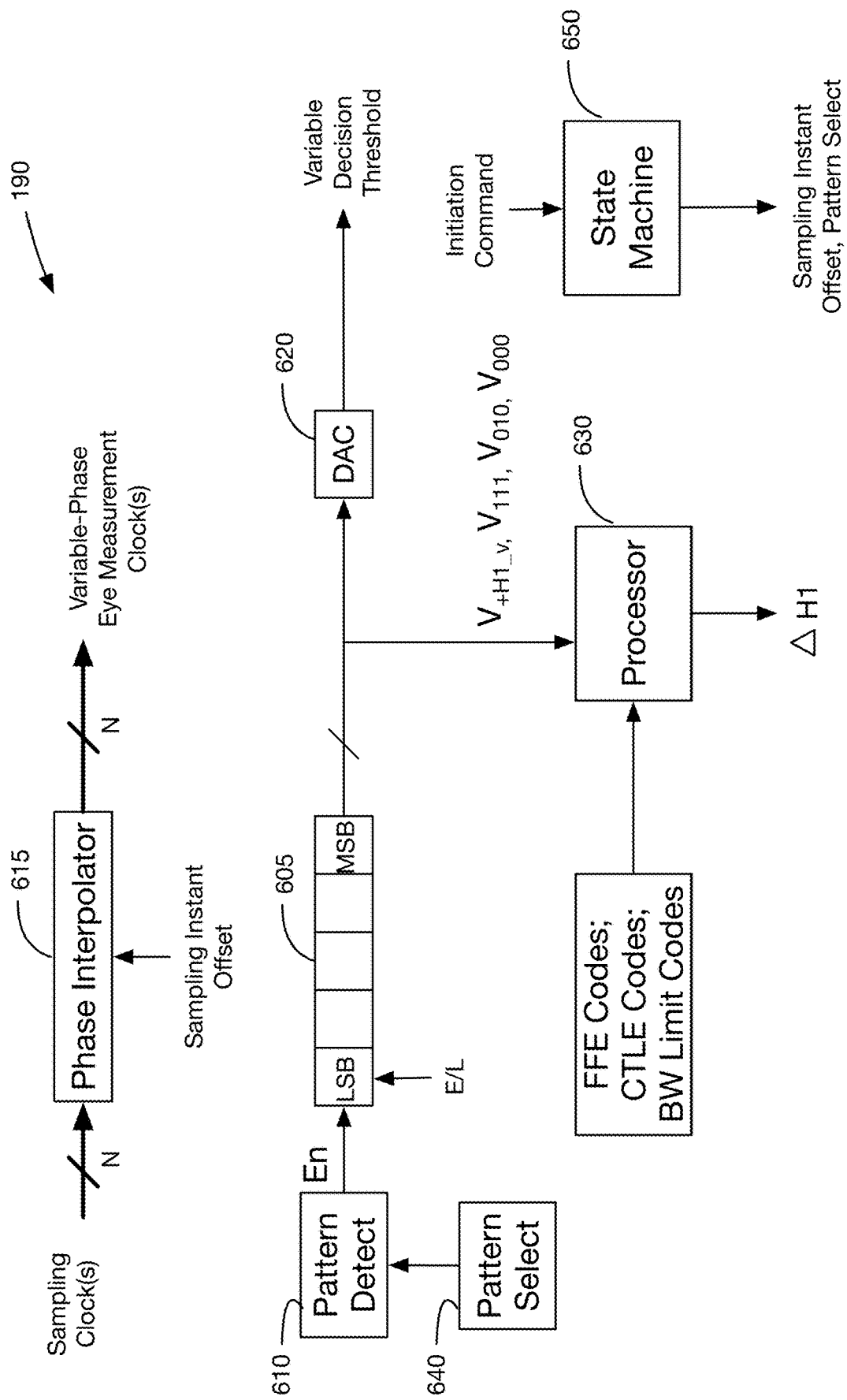
FIG. 6 is a block diagram of a measurement controller, in accordance with some embodiments.

FIG. 6 is a block diagram of exemplary components in measurement controller 190, in accordance with some embodiments. As shown, the embodiment of FIG. 6 is configurable to make the measurements $V_{+H1\_v}$, $V_{111}$, $V_{010}$, $V_{000}$, as previously described. Specifically, measurement controller 190 includes a phase interpolator 615 that may be configured to receive the data sampling clock(s) and to output variable-phase eye measurement clocks having offset sampling instants. Furthermore, measurement controller 190 includes a multi-bit register 605 that accumulates early-late (E/L) decisions from the spare sampler to adjust the variable voltage decision threshold of the spare sampler using digital-to-analog converter (DAC) 620. In some embodiments, multi-bit register 605 may be configured to accumulate pattern-verified E/L decisions by enabling accumulation of multi-bit register 605 via a pattern detection circuit 610. Furthermore, pattern detection circuit 610 may be configurable of detecting a plurality of data patterns, and one such data pattern may be selected via pattern selection circuit 640. In some embodiments, pattern detection circuit 610 may include logic elements (e.g., AND gates) that are configured to receive a sequence of data decisions from e.g., data value history 140, and detect a selected pattern using e.g., inverted inputs for a desired '0' prior data decision and non-inverted inputs for a desired '1' prior data decision (or vice versa, in the case of using logic NAND gates). At least one embodiment may have separate multi-bit registers for each transitional data pattern, and the output of a given multi-bit register currently in use may be selected e.g., by a multiplexer circuit (not shown) to be provided to DAC 620 to adjust. Other equivalent configurations may be used, and thus the specific configurations described above should not be considered limiting.

Measurement controller 190 further includes state machine 650, which may be configured to control the elements within measurement controller 190 according to a predefined algorithm. For example, state machine 650 may receive an initiation command to initiate the horizontal-centering procedure described in the method 700 of FIG. 7.

Specifically, state machine 650 may instruct the spare samplers 180 to validate that the H1 term generated by DFE circuit 150 is vertically-centered by configuring the spare samplers 180 with the locked sampling clock, and varying the variable voltage decision thresholds of the spare samplers to find the top of the signaling eye. Such configuration may include pattern detection to validate the samples for the bottom of the signaling eye (i.e., determine that samples for the bottom of the signaling eye are taken during 1-to-0 transitions for the +H1 signaling eye or determine that samples for the top of the signaling eye are taken during 0-to-1 transitions for the −H1 signaling eye, depending on implementation). Once the vertically-centered voltage decision threshold is confirmed, then the state machine may proceed to initiate processor 630 to calculate the correctional vernier value. In such embodiments state machine 650 may initiate retrieval of the transceiver control codes including one or more of the FFE codes, CTLE codes, and bandwidth limit codes, and input the transceiver control codes to a lookup table in processor 630 to determine the correctional vernier value. Alternatively, state machine 650 may configure the spare samplers 180 to obtain the signal eye measurements $V_{111}$, $V_{000}$, and $V_{010}$ used by processor 630 to calculate the correctional vernier value. Specific configurations for the spare samplers to obtain such signal eye measurements are given in more detail below.

In at least one embodiment, a method for measurement controller 190 to measure $V_{010}$ is given below. As shown in FIG. 3, the peak signal value of the [0,1,0] pattern is offset from the locked sampling. Thus, the phase interpolator 615 may offset the sampling instant of spare sampler 180 and pattern-verified early-late votes E/L from the spare sampler 180 may be accumulated in register 605 and converted to an analog voltage via DAC 620 to adjust the voltage decision threshold of spare sampler 180.

In some embodiments, the voltage swing from $V_{111}$-$V_{000}$ corresponds to a peak-to-peak voltage swing of the PAM signal, and such a characteristic may be known based on known channel measurements, transceiver control codes, etc. In such embodiments, spare sampler 180 may be configured as a peak detector. In such embodiments, the voltage decision threshold of spare sampler 180 may be increased until '1' outputs are no longer generated to find $V_{111}$ and similarly, the voltage decision threshold may be decreased until '0' outputs are no longer generated to determine $V_{000}$. Alternative embodiments may incorporate specific positive and negative peak detectors within measurement controller 190 to find the min and max values.

In some embodiments this adjustment is made by adjusting the speculative DFE term corresponding to the vertical sampling thresholds of one stage of unrolled or speculative DFE samplers. This adjustment influences the point on the signal trajectory captured for purposes of clock adjustment, moving the CDA lock phase. An alternative embodiment may adjust the sampling lock point phase directly, as with adjustment of a phase interpolator for the sampling clock.

We claim:
1. A method comprising:
   measuring a vertical opening of a signal eye of a pulse amplitude modulated (PAM) signal received over a channel to determine a vertically-centered voltage decision threshold of a sampler receiving a sampling clock;
   determining channel-characteristic parameters indicative of a frequency response of the channel;
   determining a correctional vernier value from the channel-characteristic parameters; and
   generating a horizontally-centered voltage decision threshold that introduces a horizontal sampling offset in the sampling clock in a direction closer to a horizontal center of the signal eye by combining the vertically-centered voltage decision threshold and the correctional vernier value.

2. The method of claim 1, wherein determining the channel-characteristic parameters comprises determining a peak-to-peak voltage swing of the PAM signal from a signal amplitude of a first low-frequency pattern in the PAM signal and a signal amplitude of a second low-frequency pattern in the PAM signal, and a peak signal amplitude for a transitional data pattern.

3. The method of claim 2, wherein the correctional vernier value is based on (i) a ratio between the peak signal amplitude of the transitional data pattern and one of the signal amplitudes of the first and second low-frequency patterns PAM signal and (ii) the peak-to-peak voltage swing of the PAM signal.

4. The method of claim 2, wherein the peak-to-peak voltage swing corresponds to a maximum voltage swing in the PAM signal.

5. The method of claim 2, wherein generating the peak signal amplitude for the transitional data pattern comprises generating pattern-verified samples using a spare sampler, the spare sampler having a variable sampling instant and a variable voltage decision threshold.

6. The method of claim 5, wherein generating each pattern-verified sample is generated responsive to detection of the transitional data pattern.

7. The method of claim 1, wherein the channel-characteristic parameters correspond to transceiver control codes.

8. The method of claim 5, wherein the transceiver control codes are provided as an input to a look-up table, and wherein the correctional vernier value is an output of the lookup table.

9. The method of claim 1, wherein measuring the vertical opening of the signal eye comprises measuring a top of the signal eye and a bottom of the signal eye, and wherein the vertically-centered vertical decision threshold is equidistant from the measured top and the bottom of the signal eye.

10. The method of claim 9, wherein the signal eye is pattern-specific, and wherein at least one of the top and bottom of the signal eye is associated with a transition.

11. An apparatus comprising:
    a data sampler receiving a sampling clock, the data sampler configured with a vertically-centered voltage decision threshold based on a vertical opening of a signal eye of a pulse amplitude modulated (PAM) signal received over a channel;
    a spare sampler having a variable voltage decision threshold and a variable-phase eye measurement clock signal configured by a measurement controller;
    the measurement controller configured to determine channel-characteristic parameters indicative of a frequency response of the channel by obtaining samples from the spare sampler, and to determine a correctional vernier value from the channel-characteristic parameters, the vertically-centered voltage decision threshold and the correctional vernier value combined to generate a horizontally-centered voltage decision threshold that introduces a horizontal sampling offset in the sampling clock in a direction closer to a horizontal center of the signal eye.

12. The apparatus of claim 11, wherein the measurement controller is configured to determine a voltage swing of the PAM signal from a signal amplitude of a first low-frequency pattern in the PAM signal and a signal amplitude of a second low-frequency pattern in the PAM signal, and a peak signal amplitude for a transitional data pattern.

13. The apparatus of claim 12, wherein the correctional vernier value is based on (i) a ratio between the peak signal amplitude of the transitional data pattern and one of the signal amplitudes of the first and second low-frequency patterns in the PAM signal and (ii) the voltage swing of the PAM signal between the first and second low-frequency patterns in the PAM signal.

14. The apparatus of claim 12, wherein the voltage swing corresponds to a peak-to-peak voltage swing in the PAM signal.

15. The apparatus of claim 12, wherein the measurement controller is configured to obtain pattern-verified samples from the spare sampler.

16. The apparatus of claim 15, wherein the measurement controller comprises a pattern detection circuit configured to identify pattern-verified samples generated by the spare sampler.

17. The apparatus of claim 11, wherein the channel-characteristic parameters correspond to transceiver control codes.

18. The apparatus of claim 15, wherein the measurement controller comprises a look-up table configured to receive the transceiver control codes, wherein the correctional vernier value is an output of the lookup table.

19. The apparatus of claim 11, wherein the measurement controller is configured to measure the vertical opening of the signal eye by measuring a top of the signal eye and a bottom of the signal eye, and wherein the vertically-centered vertical decision threshold is equidistant from the measured top and the bottom of the signal eye.

20. The apparatus of claim 19, wherein the signal eye is pattern-specific, and wherein at least one of the top and bottom of the signal eye is associated with a transition.

* * * * *